United States Patent [19]
Brown et al.

[11] Patent Number: 5,788,619
[45] Date of Patent: Aug. 4, 1998

[54] HYDROSTATIC SELF-LOADING CONTROLLED DEFLECTION ROLL

[75] Inventors: Dale A. Brown, Milton, Wis.; Arnold J. Roerig, Gold Canyon, Ariz.

[73] Assignee: Beloit Technologies, Inc., Wilmington, Del.

[21] Appl. No.: 807,108

[22] Filed: Feb. 5, 1997

Related U.S. Application Data

[63] Continuation of Ser. No. 291,382, Aug. 16, 1994, abandoned.

[51] Int. Cl.$^6$ .................................................. B21B 27/00
[52] U.S. Cl. .................................................. 492/7; 492/20
[58] Field of Search .................................. 492/16, 20, 6, 492/7

[56] References Cited

U.S. PATENT DOCUMENTS

| | | | |
|---|---|---|---|
| 4,213,232 | 7/1980 | Biondetti et al. | 29/116 |
| 4,327,468 | 5/1982 | Küsters et al. | 29/116 |
| 4,414,890 | 11/1983 | Schiel et al. | 100/162 |
| 4,620,348 | 11/1986 | Güttinger | 29/116 |
| 4,747,195 | 5/1988 | Snellman | 29/116 |
| 4,757,585 | 7/1988 | Niskanan | 29/116 |
| 4,793,250 | 12/1988 | Niskanen | 100/35 |
| 4,821,384 | 4/1989 | Arav | 492/7 |
| 4,837,907 | 6/1989 | Roerig et al. | 492/7 |
| 4,856,154 | 8/1989 | Nikulainen et al. | 492/16 |
| 4,864,703 | 9/1989 | Biondetti et al. | 29/116 |
| 5,060,357 | 10/1991 | Roerig et al. | 492/7 |
| 5,111,563 | 5/1992 | Brown et al. | 492/7 |
| 5,127,141 | 7/1992 | Roerig et al. | 29/116 |
| 5,193,258 | 3/1993 | Brown | 492/7 |
| 5,242,361 | 9/1993 | Brown et al. | 492/7 |

FOREIGN PATENT DOCUMENTS

| | | |
|---|---|---|
| 61-180013 | 8/1986 | Japan . |
| 63-246501 | 2/1988 | Japan . |
| 63-135610 | 6/1988 | Japan . |
| 8-507514 | 10/1989 | Japan . |
| 2-500931 | 3/1990 | Japan . |
| 3-37410 | 2/1991 | Japan . |
| 4-272293 | 9/1992 | Japan . |

*Primary Examiner*—Larry I. Schwartz
*Assistant Examiner*—Marc W. Butler
*Attorney, Agent, or Firm*—Dick J. Veneman; Raymond W. Campbell; Gerald A. Mathews

[57] ABSTRACT

A hydrostatic self-loading controlled deflection roll has a central, hydraulically operated shoe which extends substantially the entire cross-machine width of the rotating roll shell, and two outboard shoes disposed, in the cross-machine direction, outside of the nip loading zone. The use of the outboard shoes permits the use of a single, full-length nip shoe within the nip loading zone, which simplifies control and provides for more uniform temperature distribution. The outboard shoes also provide better crown control. The outboard shoes are preferably disposed within a head flange area of the roll, at the location where spherical bearings would normally be present in a conventional roll. A bearing ring is disposed axially outside of the head flange and around a portion of a bearing box at either end of the roll for rotatably supporting the roll shell about bearings in the bearing box. A barrier seal is disposed between the stationary roll shaft and the roll shell intermediate the bearings and outboard shoes.

3 Claims, 2 Drawing Sheets

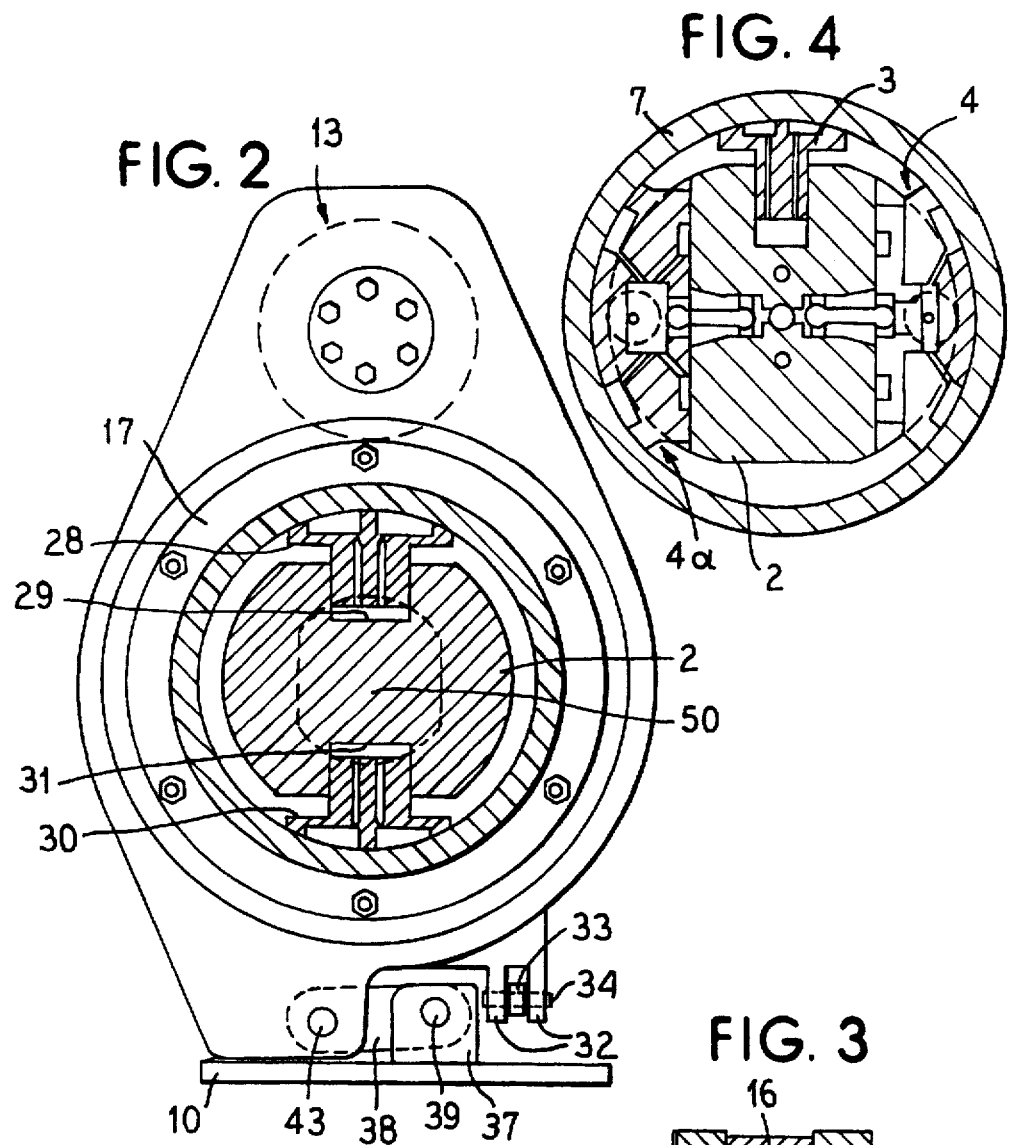
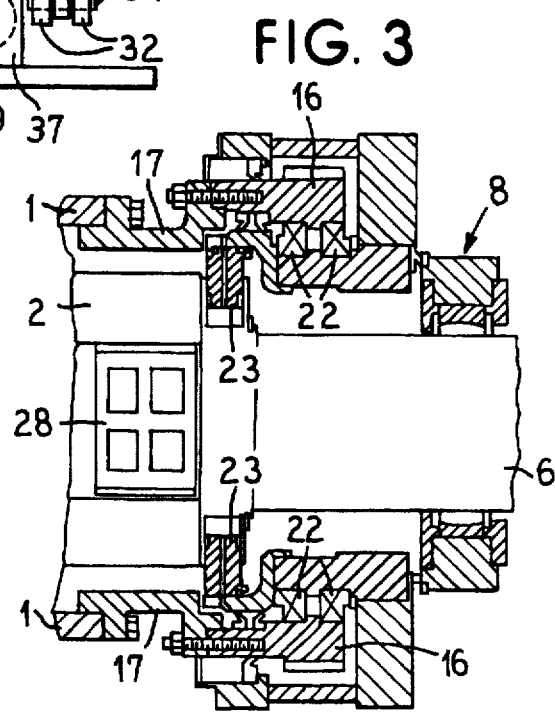

HYDROSTATIC SELF-LOADING CONTROLLED DEFLECTION ROLL

This application is a continuation of application Ser. No. 08/291,382 filed on Aug. 16, 1994 abandoned Jul. 7, 1997.

BACKGROUND OF THE INVENTION

1. Field of the Invention

The present invention is directed to a self-loading controlled deflection roll, of the type utilized as one roll in the nip of a papermaking machine for processing a traveling web of paper (or partially formed paper).

2. Description of the Prior Art

Pairs of rolls forming a nip through which a traveling web passes are used at many locations in a papermaking machine, particularly in the press section to mechanically remove water from the web. In such nips, one or both rolls are loaded, i.e., the roll is mechanically forced toward the web in order to exert a desired amount of pressure on the web as it travels through the nip. It is also necessary to be able to mechanically retract the rolls of a nip away from each other, so as to open the nip. Such retraction is necessary not only to be able to control the nip pressure, but also as part of the start-up procedure for the papermaking machine either at the beginning of a new production run, or after a sheet break. The start-up procedure involves the cutting and threading of a "tail" through the machine. The machine is threaded at operating speeds, but the speed may be increased or decreased during operation. During this start-up procedure, a nip will not be loaded at its normal operating pressure. For many years in the papermaking industry, loading of rolls was accomplished by suitable mechanisms disposed at one or both ends of the roll shaft about which the roll rotates. Such mechanisms moved the entire roll on its shaft toward and away from the mating roll in the nip.

In order to provide uniform processing of the entire width of the web in the cross-machine direction as it travels through a web, it is desirable to have the line of contact between the two rolls forming the nip be as straight as possible or, if one of the rolls has a contour which is not a straight line, to have the other roll follow that contour as closely as possible. As improving technology in the papermaking industry permitted papermaking machines to be made increasingly wider in the cross-machine direction, as well as to operate at increasingly faster speeds, the sheer weight of the roll or the roll shell, supported only at its opposite ends, resulted in a slight "sag" of the roll in a central region of the nip, thereby causing the line of contact between the two rolls in a nip to exhibit a non-uniform distance between the rolls along the cross-machine direction.

Controlled deflection rolls were developed in response to this problem. The first generation of such controlled deflection rolls were provided with mechanisms at their opposite ends so as to cause the roll shell to exhibit a slight outward bow in opposition to the aforementioned sag, so that the distance between the two rolls in the nip would be uniform along the entire cross-machine width of the nip.

More recently, so-called self-loading controlled deflection rolls have been developed, wherein a number of hydraulically operated shoes are carried on a center shaft disposed inside the roll shell, the shoes being actuatable to move toward and away from the axis of rotation of the roll, so as to push against the inner surface of the roll shell, thereby achieving the desired deflection of the outer surface of the roll shell. The need to provide complicated mechanisms at the opposite ends of the roll to move the roll toward and away from the nip is thereby avoided, and only mechanisms for rotating the roll need to be provided at one or both ends, typically only at one end. Examples of such self-loading controlled deflection rolls are disclosed in U.S. Pat. Nos. 5,193,258, 5,127,141, 5,111,563 and 4,821,384.

Such self-loading controlled deflection rolls typically have a hydraulically operated center shoe disposed at a central region of a support shaft extending through in the interior of the roll shell, as well as front and back shoes respectively disposed at the front end and the back end of the shaft inside of the shell. The center shoe typically comprises five or more shoe segments in end-aligned array extending across the roll face. All three of the shoes (including, for example, a five-segment center shoe) in a conventional self-loading controlled deflection roll design are disposed within the cross-machine extent of the nip loading zone, the nip loading zone being the cross-machine extent of the roll shell which applies pressure to the web or sheet traveling through the nip of which the roll is a part. The shoes are moved radially inwardly and outwardly (relative to the rotational axis of the roll) by means of hydraulic fluid, such as oil, which is delivered through the central shaft to the shoes. Self-loading controlled deflection rolls operate with less vibration compared to non-self-loading controlled deflection rolls of the type described earlier, which are loaded by external swing arms. Additionally, self-loading controlled deflection rolls eliminate the need for swing arms and external loading devices and are therefore more compact. Self-loading controlled deflection rolls can also eliminate the need for spherical roller bearings, which saves valuable space in the end portions of the roll. Moreover, spherical roller bearings are not well-suited to handling light loads and high speeds, which can lead to so-called roller skidding. Furthermore, the presence of spherical roller bearings in the head flange area, the head flange being a flange disposed at each end of the roll to connect the roll shell to the respective bearing and/or drive assemblies, makes the spherical roller bearings difficult to protect and lubricate for high temperature operation.

A problem with known hydrostatic self-loading controlled deflection rolls is that such rolls require multiple shoes or load elements in the nip loading zone. In such conventionally designed rolls, a single nip shoe, substantially coextensive with the cross-machine width of the roll shell, could not be used because there would then be no way to adjust the crown of the roll.

SUMMARY OF THE INVENTION

It is an object of the present invention to provide a hydrostatic self-loading controlled deflection roll which permits the use of a single hydrostatic shoe within the nip loading zone, but which still permits control of the crown of the roll.

The above object is achieved in accordance with the principles of the present invention in a self-loading controlled deflection roll having two outboard shoes disposed beyond the cross-machine extent of the nip loading zone, and a single full-length nip shoe disposed between the outboard shoes within the nip loading zone. The outboard shoes are used for crown adjustment, while the single full-length nip shoe is primarily used to adjust the nip pressure. The use of such a single full-length nip shoe in the nip loading zone provides for more uniform temperature distribution, and the use of the outboard shoes provides better crown control.

The outboard shoes respectively bear against force-transmitting elements disposed at opposite ends of the roll, and which are sufficiently rigidly attached to the roll shell so that forces exerted on the force-transmitting elements are transmitted from the outboard shoes to the roll shell for adjusting the roll shell crown. Except for the attachment to the roll shell, the force transmitting elements are also disposed beyond the extent of the nip loading zone in the cross-machine direction. Preferably, the outboard shoes are disposed in the head flange area of the roll, at the location at which spherical bearings would normally be located in a conventional roll design. Each outboard shoe is formed by a rounded piston part which engages a bore in the center shaft of the roll. Each outboard shoe has a hydrostatic bearing shoe surface which bears against the inside surface of the head flange, which serves as the force-transmitting element. One or two outboard shoes are disposed within each head flange, and they are in-line with the nip plane extending through the nip and the longitudinal axis of the roll.

The details of the piston structure and operation may be as disclosed, for example, in U.S. Pat. Nos. 3,802,044 and 3,885,283. Completely hydrostatic guide means are used to move the roll shell radially, for opening and closing the nip, as described in U.S. Pat. No. 5,060,357. Barrier-type seals as shown in U.S. Pat. No. 5,010,633 can be used to permit the roll to operate at high temperatures.

Both the gear box and the front bearing box are mounted to the roll shell by the head flanges. Concentric rotary seals are used within the gear box and the front bearing box. The outboard shoes are located outboard (i.e., beyond) the sheet path or nip zone, thereby making possible the use of a full-face nip shoe with the aforementioned advantages. It is still possible, however, to employ multiple nip shoes within the nip loading zone, if desired for a particular application. Another possibility is to use a further single shoe, or multiple shoes, oriented at 180° from the aforementioned single shoe or multiple shoes, i.e., disposed at an opposite side of the roll center shaft.

The roll can be operated at conventional temperatures, or at high temperatures. High temperature roller bearings are not required and the conventional spherical roller bearings are completely eliminated. The design permits the use of high-speed tapered roller bearings and visible external lockup means for added safety.

DESCRIPTION OF THE DRAWINGS

FIG. 2 is a sectional view taken along line II—II of FIG. 1.

FIG. 3 is a plan view, partly in section, of the driven end of the roll of FIG. 1.

FIG. 4 is a sectional view taken along line IV—IV of FIG. 1.

DESCRIPTION OF THE PREFERRED EMBODIMENTS

Figure 1:
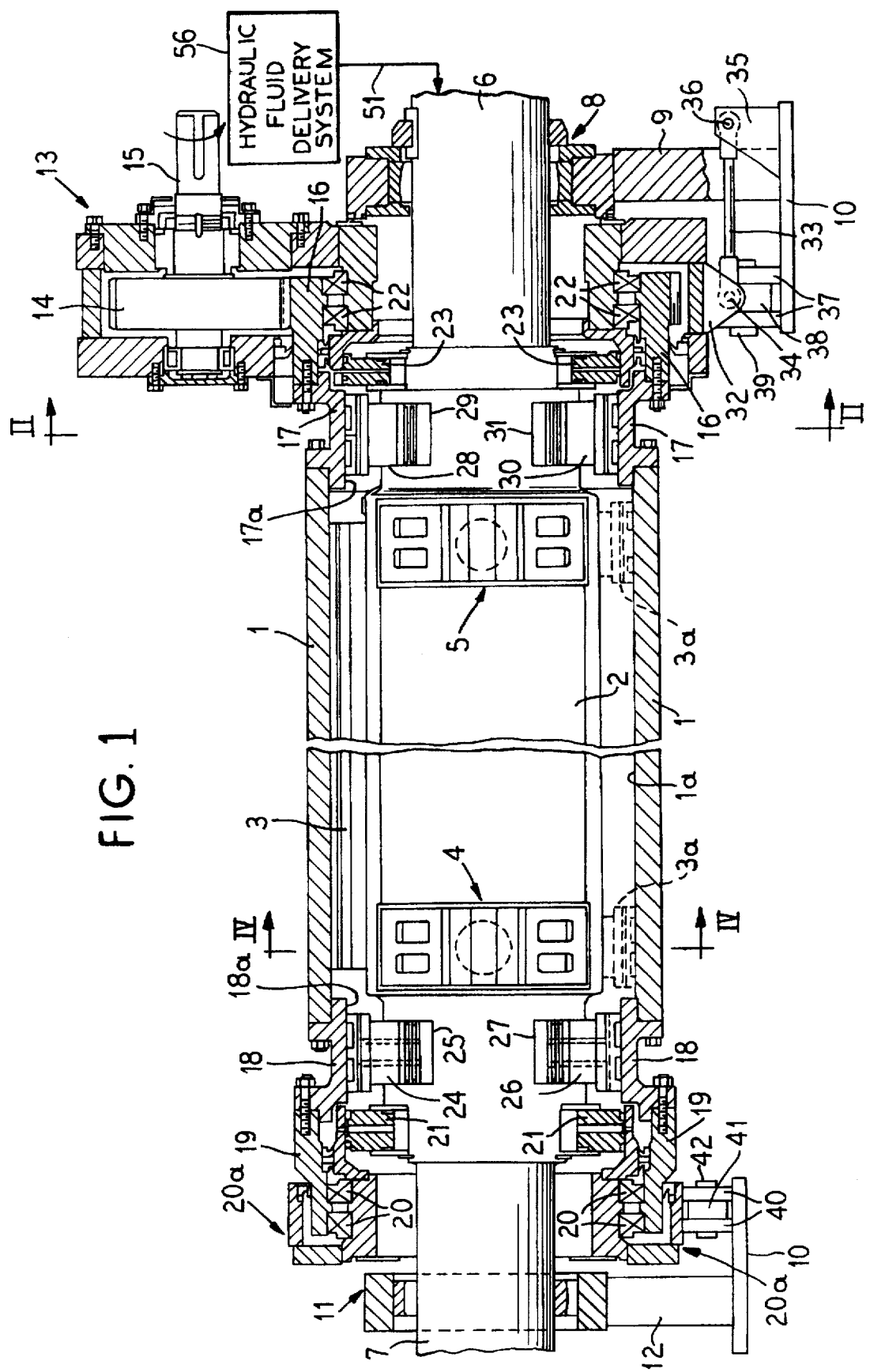
FIG. 1 is an elevational view, partly in section along the cross-machine direction, of a hydrostatic self-loading controlled deflection roll constructed in accordance with the principles of the present invention.

The hydrostatic self-loading controlled deflection roll constructed in accordance with the principles of the present invention shown in FIG. 1 includes a hollow roll shell 1 having a cylindrical inner surface 1a through which a center shaft 2 extends. The center shaft 2 preferably carries a full-face nip loading shoe 3. The nip loading shoe 3 has a piston part which is received in a channel (not shown) of the center shaft 2, the channel being fed with pressurized hydraulic fluid from a fluid delivery system 56 by feed lines designated generally by line 51 extending through the center shaft 2. The nip loading shoe 3 can thus be operated hydraulically so as to move the roll shell 1 toward and away from another roll to open and close a nip, formed by the roll shown in FIG. 1 and another roll. The nip loading shoe 3 extends, in the cross machine direction, substantially the entire width of the nip loading zone, i.e., the zone in which the web or sheet traveling through the nip is subjected to pressure. Although a full-face shoe is the preferred embodiment, for some applications multiple, smaller width shoes may be used instead of the full-face shoe 3.

Guide shoes generally referenced 4 and 5 are also provided. Similar guide shoes are also present on the opposite side of the roll, one of which, referenced 4a, can be seen in FIG. 4. If desired, additional shoes 3a, oriented at 180° relative to the shoe 3, can be provided. Alternatively; another full-face shoe could be provided at the location of the shoes 3a. All of the shoes 4, 5, 4a and 3a are hydraulically operated by hydraulic lines (not shown) extending through the center shaft 2, as part of the aforementioned fluid delivery system.

The center shaft 2 has stub arbors 6 and 7 disposed at opposite ends thereof. The stub arbor 6 extends through a gear box at a driven end of the roll, and is received in a bearing assembly 8 supported by a stand 9 resting on the floor 10 (or some other suitable, fixed supporting surface). The stub arbor 7 extends through a bearing assembly 11 at the opposite end of the roll, which is supported on a stand 1 2 resting on the floor 10. The stub arbors 6 and 7 respectively are supported within the bearing assemblies 8 and 11. Center shaft 2 and stub members 6 and 7 do not rotate. Spherical bearings 8 and 11 support the center shaft 2 and allow for deflection and thermal expansion of the center shaft. The roll shell 1 is rotatably driven by gear drive assembly 13.

Such rotation is imparted to the roll by a drive assembly 13, which is of a conventional structure and therefore only the basic components thereof will be described in further detail. The drive assembly 13 includes a drive gear 14, which is rotated by a shaft 15, connected to a prime mover (not shown). The teeth of the drive gear 14 engage teeth of a gear 16 which is bolted to one side of a head flange 17, the other side of the head flange 17 being bolted to the roll shell 1.

At the opposite end of the roll, the other end of the roll shell 1 is bolted to one side of a head flange 18, the other side of the head flange 18 being bolted to a bearing ring 19. The bearing ring 19 rides on bearings 20, contained in an annular bearing box 20a. Gear 16, which is also structurally analogous to bearing ring 19, rides on bearings 22 contained in the drive assembly at the driven end of the roll. An annular barrier seal 21, 23 is disposed inwardly of the bearings 20, 22 respectively and is also fed by a hydraulic line (not shown) extending through the center shaft 2 as part of the aforementioned fluid delivery system.

At the opposite end of the roll, the gear 1 6 rides on bearings 22, and a barrier seal 23, also fed by the aforementioned hydraulic system, is provided inwardly of the bearings 22. The bearings 20 and 22 can be high speed tapered roller bearings.

A pair of outboard shoes 24 and 26 are disposed at one end of the roll, and another pair of outboard shoes 28 and 30 are disposed at the opposite end. The pairs of outboard shoes are disposed beyond, in the cross-machine direction, the extent of the nip loading zone, and can be the exclusive means, or combined with shoe 3, employed to adjust the crown of the roll shell 1. The nip loading shoe 3 (and the other, multiple, smaller width shoes which may possibly be disposed within the nip loading zone) do not contribute, or at least do not primarily contribute, to adjusting the crown of the roll shell 1, and are primarily used for other purposes. Actuating shoes 24,26 and 28,30 improves or increases the range of roll crown adjustment.

The pairs of outboard shoes are shown in FIG. 1 at their preferred locations, respectively within the head flanges 17 and 18. The outboard shoes 24 and 26 are respectively received in bores 25 and 27 in the center shaft 2, the bores 25 and 27 being fed by hydraulic lines (not shown) extending through the center shaft 2, as part of the aforementioned fluid delivery system. Each outboard shoe 24 and 26 has a hydrostatic bearing shoe surface which bears against the inside surface of the head flange 18, the shoe surfaces being fed with hydraulic fluid through bores in the respective shoes 24 and 26.

Similarly, the outboard shoes 28 and 30 are respectively received in bores 29 and 31 in the center shaft 2, the bores 29 and 31 also being fed by hydraulic lines (not shown) from the aforementioned fluid delivery system. The outboard shoes 28 and 30 also each have hydrostatic bearing shoe surfaces, which bear against the inside surface of the head flange 17. The hydrostatic bearing shoe surfaces of the outboard shoes 28 and 30 are also fed via hydraulic lines (not shown) in the shoes 28 and 30, identical to the bores in the shoes 24 and 26. By controlled hydraulic operation of the shoes 24 and 26 and the shoes 28 and 30, the crown of the roll shell 1 can be adjusted as needed, not only to compensate for non-linear nip shapes, but also to open and close the nip.

The driven end of the roll is also provided with coupling flanges 32, which surround one end of a rod 33, which is pivotably held between the coupling flanges 32 by a pin 34. The opposite end of the rod 33 is similarly pivotally mounted to a mount 35, resting on the floor 10, by means of a pin 36. The roll is provided with two torque links 38,41 at opposite ends. At the driven end, coupling flanges 37, attached to the floor 10, receive a link 38 therebetween, pivotably mounted by a pin 39. At the opposite end, coupling flanges 40, also mounted on the floor 10, receive a link 41 pivotably held by a pin 42. As can be seen in FIG. 2, the overall shell rotational support assembly is restrained from revolving around the roll axis 50 by links 38 and 41. The torque links 38,41 keep gear box 13 and bearing box 20a from rotating about the longitudinal axis of the roll shell when power is applied to shaft 15. The position of the rod 33 can be adjusted, and moved during operation, so as to adjust the axial position of the overall roll assembly.

A plan view of the driven end of the roll assembly is shown in FIG. 3. FIG. 3 shows the bearing surface of the shoe 28. The drive assembly 13 has been removed in the view of FIG. 3, with a horizontal plane section being shown through the driven elements associated with the roll (but the stub arbor 6, the center shaft 2 and the shoe 28 are not sectioned).

FIG. 4 shows an example of an arrangement of the guide shoe assembly 4, which also shows a further guide shoe assembly 4a disposed on an opposite side of the center shaft 2 from the assembly 4. (The guide shoe assembly 5 also has such an oppositely-disposed (but not shown) assembly associated therewith.) The full face loading shoe 3 is also shown in section in FIG. 4. The hydraulic lines in the center shaft 2 can be seen in FIG. 4, as can the lines leading to the respective hydrostatic bearing surfaces of the shoes.

Although the roll disclosed herein has been described in the context of a driven roll, the principles of the present invention can be used with equal benefit in a non-driven roll.

Although modifications and changes may be suggested by those skilled in the art, it is the intention of the inventors to embody within the patent warranted hereon all changes and modifications as reasonably and properly come within the scope of their contribution to the art.

We claim as our invention:

1. A self-loading controlled deflection roll for use in a nip, the roll having a nip loading zone having a longitudinal direction along the roll, comprising:

a hollow, cylindrical roll shell having an inner surface;

a center shaft having a longitudinal axis and extending through said roll shell and spaced from said inner surface;

loading shoe means for loading said nip along a nip loading zone extending longitudinally along the inner surface of the roll shell, said loading shoe means displaceably mounted in said center shaft for movement toward and away from said center shaft in a nip plane extending along the nip and the longitudinal axis, said loading zone means being substantially coextensive in the longitudinal direction and establishing the length of said nip loading zone, and bearing against said inner surface of said roll shell;

first and second head flanges rigidly attached to opposite ends of said roll shell, concentric with the inner surface thereof, said head flanges extending longitudinally beyond said nip loading zone and providing a force-transmitting inner surface;

bearing means, including bearings mounted in a bearing box and in a drive assembly at either end of the roll, operatively linked with, and extending axially outwardly from, each of the first and second head flanges, for rotatably supporting said roll shell about the center shaft;

first and second hydraulically operated outboard shoe means respectively disposed at opposite ends of said loading shoe means longitudinally beyond said nip loading zone intermediate the nip loading zone and the bearing means at each end of the roll, each of said first and second outboard shoe means being displaceably mounted in said center shaft for movement toward and away from said center shaft, and for providing roll shell deflection control force to the respective inner surfaces of the first and second head flanges;

first and second annular barrier seals mounted in the center shaft at either end of the roll intermediate a corresponding outboard shoe means and the bearing means at either end of the roll, the first and second barrier seals radially adjustably extending between the center shaft and a corresponding bearing box and drive assembly to thereby seal the bearings at each end of the roll from hydraulic fluid in the interior of the roll during operation of the roll;

means for hydraulically displacing said loading shoe means to open and close said nip and for hydraulically displacing said first and second outboard shoe means to adjust the deflection or crown of said roll shell.

2. A self-loading controlled deflection roll as claimed in claim 1, wherein each of said outboard shoe means comprises two shoes diametrically disposed relative to each other on said center shaft, and disposed to move relative to the shaft in the nip plane as the loading shoe means.

3. A self-loading controlled deflection roll as set forth in claim 1, further including:

bearing assemblies disposed at each end of the roll for supporting the ends of the shaft, the bearing assemblies including spherical bearings so that the shaft can deflect, and expand axially, relative to the roll shell.

* * * * *